(12) United States Patent
Morishita

(10) Patent No.: US 10,812,312 B2
(45) Date of Patent: *Oct. 20, 2020

(54) TERMINAL DEVICE, SERVER DEVICE, PROGRAM, AND METHOD

(71) Applicant: GungHo Online Entertainment, Inc., Tokyo (JP)

(72) Inventor: Kazuki Morishita, Tokyo (JP)

(73) Assignee: GungHo Online Entertainment, Inc. (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/707,608

(22) Filed: Dec. 9, 2019

(65) Prior Publication Data

US 2020/0119968 A1 Apr. 16, 2020

Related U.S. Application Data

(63) Continuation of application No. 15/685,313, which is a continuation of application No.
(Continued)

(51) Int. Cl.
*H04L 29/06* (2006.01)
*A63F 13/216* (2014.01)
(Continued)

(52) U.S. Cl.
CPC ...... *H04L 29/06047* (2013.01); *A63F 13/211* (2014.09); *A63F 13/216* (2014.09);
(Continued)

(58) Field of Classification Search
USPC ........................................................ 709/203
See application file for complete search history.

(56) References Cited

U.S. PATENT DOCUMENTS

2006/0105838 A1* 5/2006 Mullen .................. A63F 13/12
463/31
2013/0314407 A1* 11/2013 Meehan ................ G06T 19/006
345/419
(Continued)

FOREIGN PATENT DOCUMENTS

JP H09-140933 A 6/1997
JP 2001-096068 A 4/2001
(Continued)

OTHER PUBLICATIONS

"Nora to Toki no Kobo: Kiri no Mori no Majo", Perfect Guide, Enterbrain, Inc., Sep. 12, 2011, pp. 22-26 (17 pages).

*Primary Examiner* — Hermon Asres
(74) *Attorney, Agent, or Firm* — Harness, Dickey & Pierce, P.L.C.

(57) ABSTRACT

A terminal device including: a memory configured to store computer-readable instructions and item information relating to a plurality of first items virtually arranged in association with a plurality of first predetermined positions in a real world, the plurality of first items corresponding to a plurality of items used in a game application; and a processor configured to execute the computer-readable instructions so as to detect a providable first item being virtually arranged within a predetermined range from a current user position in the real world, provide the providable first item to a user who is executable the game application, create a second item based on the providable first item usable in the game application, and associate the created second item with a second predetermined position in the real world.

20 Claims, 16 Drawing Sheets

Related U.S. Application Data

PCT/JP2017/014062, filed on Apr. 4, 2017, now Pat. No. 10,547,492.

(51) Int. Cl.
    *A63F 13/2145*     (2014.01)
    *A63F 13/80*     (2014.01)
    *A63F 13/42*     (2014.01)
    *A63F 13/211*     (2014.01)
    *A63F 13/69*     (2014.01)

(52) U.S. Cl.
    CPC .......... *A63F 13/2145* (2014.09); *A63F 13/42* (2014.09); *A63F 13/69* (2014.09); *A63F 13/80* (2014.09); *H04L 67/38* (2013.01); *A63F 2300/6018* (2013.01); *A63F 2300/807* (2013.01)

(56) References Cited

U.S. PATENT DOCUMENTS

2016/0121215 A1     5/2016   Fukazawa et al.
2016/0346683 A1*  12/2016  Worrall .................. A63F 13/79

FOREIGN PATENT DOCUMENTS

JP       2016-086970 A     5/2016
JP           5941241 B1     6/2016

* cited by examiner

| UNIT GAME ID | POSITION | ARRANGEMENT PERIOD |
|---|---|---|
| G1 | (N1,N1) | - |
| G2 | (N2,N2) | - |
| G3 | (N3,N3) | 0:00AM-9:30AM |
| G4 | (N4,N4) | 10:00AM-0:00PM |
| ⋮ | ⋮ | ⋮ |

FIG. 5B

| PART ID | POSITION | ARRANGEMENT PERIOD |
|---------|----------|--------------------|
| P1 | (n1,e1) | - |
| P1 | (n2,e2) | 0:00AM-9:30AM |
| P2 | (n3,e3) | 10:00AM-0:00PM |
| P3 | (n4,e4) | - |
| ⋮ | ⋮ | ⋮ |

FIG. 5C

| UNIT GAME ID | BACKGROUND | WALL | FLOOR | ENEMY CHARACTER |
|--------------|------------|------|-------|-----------------|
| G1 | P1 | P3 | P5 | P7 |
| G2 | P1 | P4 | P5 | P7 |
| G3 | P2 | P3 | P5 | P7 |
| G4 | P2 | P4 | P5 | P7 |

FIG. 5D

| PART ID | TYPE |
|---------|------|
| P1 | BACKGROUND |
| P2 | BACKGROUND |
| P3 | WALL |
| P4 | WALL |
| P5 | FLOOR |
| P6 | FLOOR |
| P7 | ENEMY CHARACTER |
| P8 | ENEMY CHARACTER |
| P9 | ENEMY CHARACTER |
| ⋮ | ⋮ |
| Pn | N |

FIG. 5E

| USER ID | USER NAME | P1 | P2 | P3 | ... | Pn | CURRENT PLACE | RELEASED GAME |
|---------|-----------|----|----|----|-----|----|---------------|---------------|
| I | USER(a) | 3 | 9 | 10 | ... | 5 | (X1,Y1) | G1 |
| II | USER(b) | 0 | 6 | 3 | ... | 0 | (X2,Y2) | G2 |
| III | USER(c) | 4 | 6 | 12 | ... | 20 | (X3,Y3) | - |
| IV | USER(d) | 30 | 2 | 1 | ... | 5 | (X4,Y4) | G4 |
| V | USER(e) | 2 | 10 | 3 | ... | 2 | (X5,Y5) | - |
| ⋮ | ⋮ | ⋮ | ⋮ | ⋮ | ... | ⋮ | ⋮ | ⋮ |

| UNIT GAME ID | BACKGROUND | WALL | FLOOR | ENEMY CHARACTER |
|---|---|---|---|---|
| G1 | P1 | P3 | P5 | P7 |
| G2 | P1 | P4 | P5 | P7 |
| G3 | P2 | P3 | P5 | P7 |
| G4 | P2 | P4 | P5 | P7 |
| Gx | P2 | P4 | P6 | P9 |

FIG. 13B

| UNIT GAME ID | POSITION | ARRANGEMENT PERIOD |
|---|---|---|
| G1 | (N1,N1) | - |
| G2 | (N2,N2) | - |
| G3 | (N3,N3) | 0:00AM-9:30AM |
| G4 | (N4,N4) | 10:00AM-0:00PM |
| Gx | (Nx,Nx) | 9:00AM-9:00PM |
| ⋮ | ⋮ | ⋮ |

TERMINAL DEVICE, SERVER DEVICE, PROGRAM, AND METHOD

CROSS-REFERENCE TO RELATED APPLICATIONS

This application is a continuation of U.S. patent application Ser. No. 15/685,313, filed Aug. 24, 2017, which is a continuation application of International Application No. PCT/JP2017/014062, filed Apr. 4, 2017. The contents of both of the above applications are incorporated herein by reference in their entireties.

TECHNICAL FIELD

The present disclosure relates to a terminal device and a server device by which a user can create a new item, and a program and a method for executing the terminal device and the server device.

BACKGROUND

Conventionally, terminal devices that enable a user himself/herself to create dungeons included in roll-playing games are known. For example, JPH09-140933 A describes a device that is transferred to a mode to create a dungeon on the basis of a command input by a user, receives a command that specifies a size and a position of a room in which the dungeon is configured, and enables the user himself/herself to create the new dungeon.

SUMMARY

Therefore, in view of the above-described technology, the present disclosure provides a terminal device, a server device, a program, or a method that enables creation of a more enjoyable new item by various embodiments.

According to an aspect of the present disclosure, there is provided "a terminal device comprising: a memory configured to store computer-readable instructions and item information related to a first item virtually arranged in association with a predetermined position in a real world, of a plurality of items used in a game application; and a processor configured to execute the computer-readable instructions so as to: provide a user who executes the game application with a first item virtually arranged within a predetermined range from a current place in the real world, of the first items; create a second item usable in the game application on the basis of the provided first item; and associate the created second item with any position in the real world".

According to an aspect of the present disclosure, there is provided "a server device comprising: a memory configured to store computer-readable instructions and item information related to a first item virtually arranged in association with a predetermined position in a real world, of a plurality of items used in a game application executed in a terminal device; a communication circuit configured to perform communication with the terminal device; and a processor configured to execute the computer-readable instructions so as to: transmit the item information from the communication circuit to the terminal device; receive item information related to a second item from the terminal device through the communication circuit, the second item being created on the basis of a first item virtually arranged within a predetermined range from a current place of the terminal device in the real world and provided to a user who executes the game application, of the first items, and being associated with any position in the real world; and perform control to store the received item information related to the second item in the memory".

According to an aspect of the present disclosure, there is provided "a computer program product embodying computer-readable instructions stored on a non-transitory computer-readable medium for causing a computer to execute a process by a processor, the computer including: a memory configured to store item information related to a first item virtually arranged in association with a predetermined position in a real world, of a plurality of items used in a game application, the computer configured to perform the steps of: providing a user who executes the game application with a first item virtually arranged within a predetermined range from a current place in the real world, of the first items; creating a second item usable in the game application on the basis of the provided first item; associating the created second item with any position in the real world".

According to an aspect of the present disclosure, there is provided "a method for causing a processor in a terminal device to execute a process, the terminal device including: a memory configured to store item information related to a first item virtually arranged in association with a predetermined position in a real world, of a plurality of items used in a game application, the method comprising executing on the processor the steps of: providing a user who executes the game application with a first item virtually arranged within a predetermined range from a current place in the real world, of the first items; creating a second item usable in the game application on the basis of the provided first item; and associating the created second item with any position in the real world".

According to various embodiments of the present disclosure, a terminal device, a server device, a program, or a method that enables creation of a more enjoyable new item can be provided.

Note that the above-described effect is illustrative only for convenience of description and is not restrictive. Any effect described in the present disclosure and an effect obvious for a person skilled in the art can also be exhibited in addition to or in place of the above-described effect.

BRIEF DESCRIPTION OF DRAWINGS

FIG. 5B is a diagram conceptually illustrating a part arrangement information table stored in the server device according to the first embodiment of the present disclosure;

FIG. 5C is a diagram conceptually illustrating a unit game information table stored in the server device according to the first embodiment of the present disclosure;

FIG. 5D is a diagram conceptually illustrating a part information table stored in the server device according to the first embodiment of the present disclosure;

FIG. 5E is a diagram conceptually illustrating a user information table stored in the server device according to the first embodiment of the present disclosure;

FIG. 13B is a diagram conceptually illustrating a unit game arrangement information table stored in the server device according to the first embodiment of the present disclosure;

DETAILED DESCRIPTION

Figure 1:
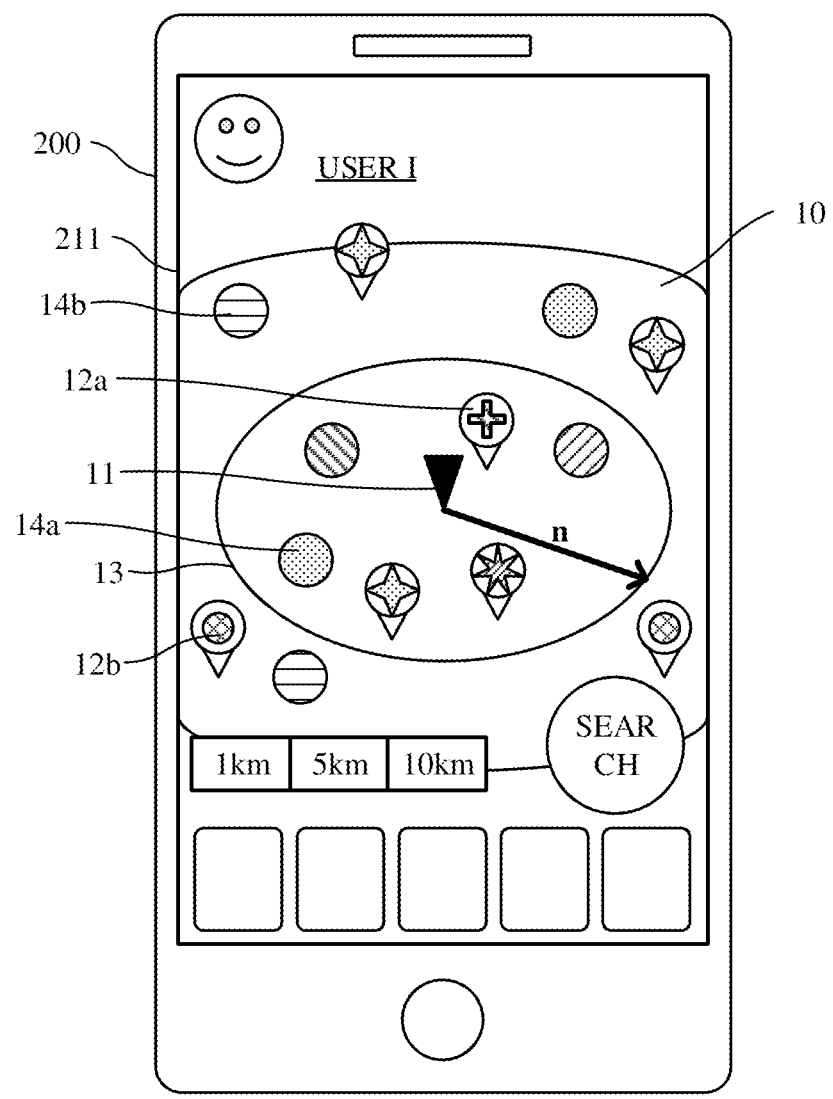
FIG. 1 is a diagram for describing a system according to various embodiments of the present disclosure.

Various embodiments of the present disclosure will be described with reference to the appended drawings. Note that a component common in the drawings is denoted with the same reference sign.

Outline of System According to Present Disclosure

An example of a system according to various embodiments of the present disclosure includes a system that executes a game application in which, when a user acquires an item (first item) virtually arranged in a predetermined range from a position (for example, a current place) of a terminal device in a real world, the user himself/herself can newly create an item (second item) to be used in the game application, using the acquired item (first item).

A game element is a group of an information unit used in execution of a game application, and the game elements can include an element that directly influences progress of the game application and an element that does not directly influence the progress of the game application. Among the game elements, an item refers to a game element usable or available, or usable and available for the user during the execution of the game application. Examples of such an item include a unit game (for example, a quest, a scenario, a chapter, a dungeon, a mission, or an event) that means unity of one or a plurality of games included in the game application, a character appearing in the game application, a virtual game space itself, and an equipment usable by a character. Further, individual parts (for example, parts such as a wall and an enemy character that configures a unit game and parts such as arms that configure characters) that configure the items can also be exemplified as items. In the present disclosure, the first item refers to an item virtually arranged in association with a predetermined position of a real world, of the items, and at least some of the first items are provided to the user when a predetermined condition is satisfied. Further, the second item refers to a new item usable in the game application, which is created by using the first item provided to the user.

The game application executed in the system can be any game application as long as the game application uses the above-described items. Examples of the game application include a battle-type game in which a plurality of characters battles, a breakout game, a puzzle game, a roll-playing game, and a sport game.

FIG. 1 is a diagram for describing a system according to various embodiments of the present disclosure. Referring to FIG. 1, when the game application is executed in a terminal device 200, the first items available for the user are displayed on a display 211 in association with a map in a real world. To be specific, when information of a current place detected in the terminal device 200 is transmitted to a server device, the server device transmits item information related to the first items stored in association with a peripheral position of the current place, to the terminal device 200. Then, the terminal device 200 arranges each of the first items together with a current place 11 on a virtual game space 10 displayed on the display 211 on the basis of the received item information. In the example of FIG. 1, for example, a unit game 12a that enables execution of a unit game upon acquisition, a part 14a that serves as a component of when the user himself/herself creates the unit game upon acquisition, and the like are virtually arranged around the current place 11. At this time, the unit game 12a, the part 14a, and the like virtually arranged within a predetermined distance n (for example, 1 km) (within a range object 13) from the current place 11 in the real world are provided to the user as privileges upon selection by the user. Meanwhile, a unit game 12b, a part 14b, and the like are not virtually arranged within the predetermined distance n and are thus not provided to the user, and can be provided when the current place moves and comes within the predetermined distance n. After that, the server device manages the first items provided to the user, and the user himself/herself of the terminal device 200 can create a new unit game by appropriately combining the parts 14a that configure the unit game.

First Embodiment

Figure 2:
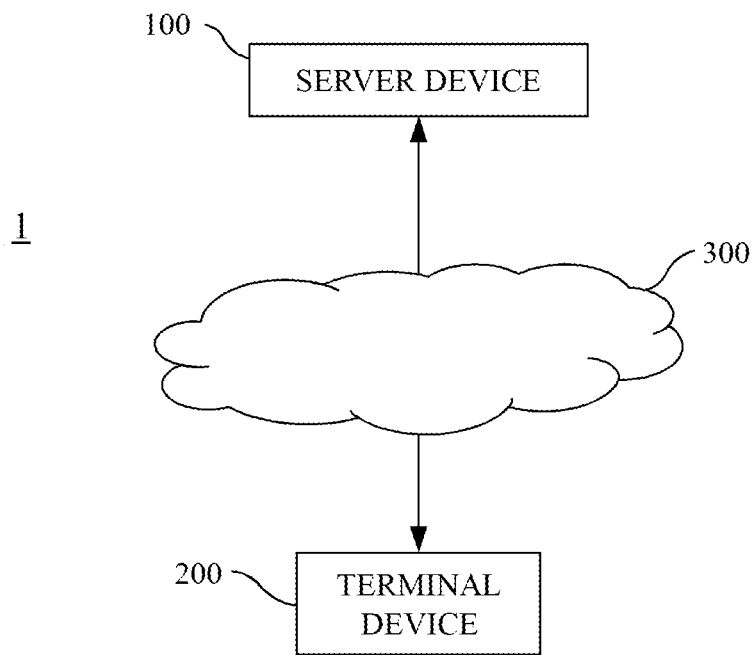
FIG. 2 is a conceptual diagram schematically illustrating a configuration of a system according to a first embodiment of the present disclosure.

1. Configuration of System 1 According to First Embodiment of Present Disclosure FIG. 2 is a conceptual diagram schematically illustrating a configuration of a system 1 according to a first embodiment of the present disclosure. Referring to FIG. 2, the system 1 is configured from a server device 100 and a terminal device 200 communicatively connected with the server device 100 through a network 300. Note that, in the example of FIG. 2, only one terminal device 200 is described. However, obviously, the system 1 can be executed, by connecting a plurality of the terminal devices 200 with the server device 100. Further, the server device 100 is described as a single device. However, components and processing of the server device 100 can be distributed in a plurality of server devices.

In the system 1, processing of a predetermined application is performed by execution of a program stored in the terminal device 200. At this time, the server device 100 accesses the terminal device 200 as needed according to progress of the application in the terminal device 200, and transmits and receives various types of information (for example, FIGS. 5A to 5E) and programs necessary for the progress of the application.

2. Server Device 100

Figure 3:
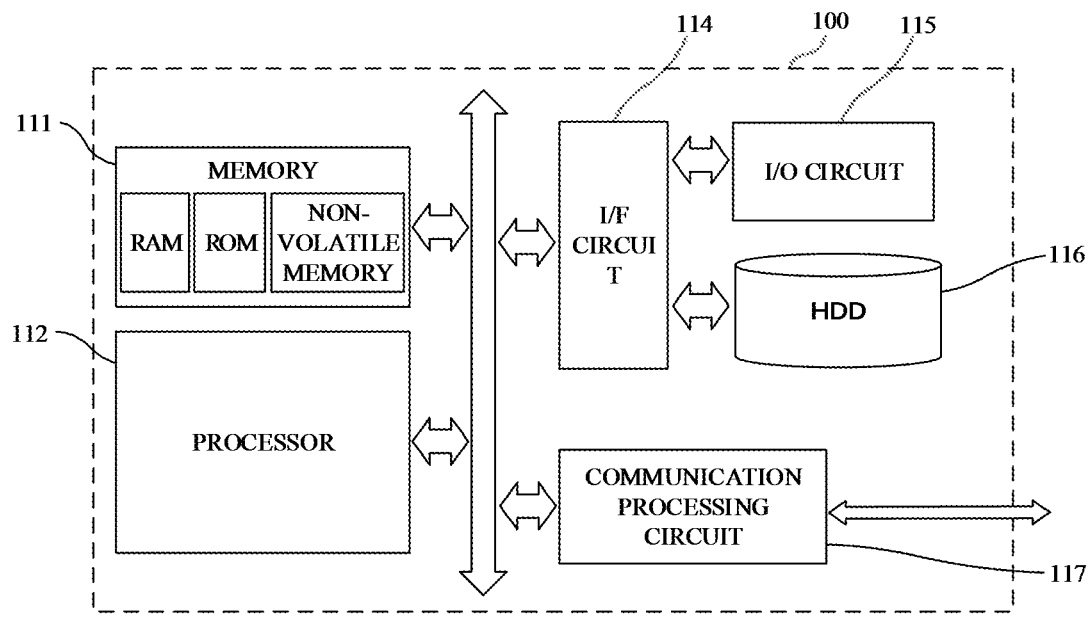
FIG. 3 is a block diagram illustrating an example of a configuration of a server device according to the first embodiment of the present disclosure.

FIG. 3 is a block diagram illustrating an example of a configuration of the server device 100 according to the first embodiment of the present disclosure. The server device 100 does not necessarily include all the components illustrated in FIG. 3, and can have a partially omitted configuration or a configuration to which another component is added.

According to FIG. 3, the server device 100 includes a memory 111 including a RAM, a ROM, and a non-volatile memory, a processor 112 configured from a CPU and the like, an I/F circuit 114 for connecting an I/O circuit 115 and an HDD 116, and a communication circuit including a communication processing circuit 117. Then, these components are electrically connected with one another through a control line and a data line.

The memory 111 includes the RAM, the ROM, the non-volatile memory, and the like, and functions as a storage unit together with the HDD 116. Then, the memory 111 stores various programs for execution of the system 1 in the server device 100 (for example, a program for extracting an item, a program for providing an item, and a program for executing a unit game), and a system that can execute the programs. Such programs and a system are loaded and executed by the processor 112. Further, the memory 111 (especially, the RAM) is temporarily used for execution of writing and reading of data while the programs are executed by the processor 112.

The processor 112 is configured from the CPU (a microcomputer), and functions as a control unit for controlling other connected components on the basis of the various programs stored in the memory 111. For example, the processor 112 extracts the first item existing within a predetermined range from the current place of the terminal device 200, by reference to arrangement information tables (FIGS. 5A and 5B) stored in the memory 111 and controls execution of the program for providing the first item to the user in response to a selection operation by the user and execution of the program for creating the unit game by the user himself/herself on the basis of the provided first item. Further, the processor 112 controls the communication processing circuit 117 to transmit and receive various types of information to/from a plurality of terminal devices including the terminal device 200. Further, the processor 112 controls the memory 111 and the HDD 116 to perform readout and update processing of the various types of information (FIGS. 5A to 5E) stored in the memory 111 and the HDD 116. Note that the processor 112 may be configured from a single CPU or may be configured from a plurality of CPUs.

The HDD 116 exchanges various types of information with another component through the I/F circuit 114. The HDD 116 stores the various types of information (FIGS. 5A to 5E) necessary for the application executed in the terminal device 200, and the like, and reads and writes the information as needed in response to an instruction from the processor 112.

Note that, in the present embodiment, the memory 111 that includes the RAM, the ROM, the non-volatile memory, and the like, and the HDD 116 are separately described. However, the memory 111 and the HDD 116 function as a storage unit.

The communication processing circuit 117 performs modulation and demodulation processing for transmitting and receiving a program for execution of the game application according to the present embodiment, and various types of information, and the like to/from the terminal device 200 through the network 300 or another server device through the network 300, as an example. The communication processing circuit 117 is connected with an antenna and the like, and performs communication with the terminal device and another server device according to a predetermined communication method through the antenna and the like.

3. Terminal Device 200

Figures 4, 5A:
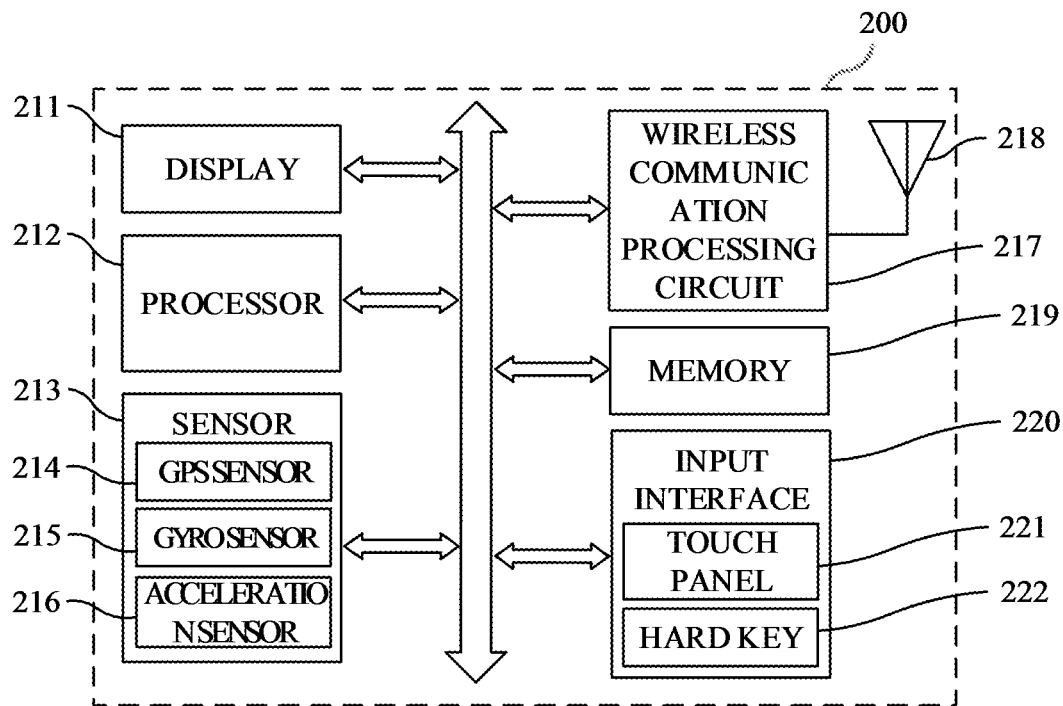
FIG. 4 is a block diagram illustrating an example of a configuration of a terminal device according to the first embodiment of the present disclosure.
FIG. 5A is a diagram conceptually illustrating a unit game arrangement information table stored in the server device according to the first embodiment of the present disclosure.

FIG. 4 is a block diagram illustrating an example of a configuration of the terminal device 200 according to the first embodiment of the present disclosure. The terminal device 200 does not necessarily include all the components illustrated in FIG. 4, and can have a partially omitted configuration or a configuration to which another component is added.

The terminal device 200 can be a portable terminal device that can perform wireless communication, represented by a smart phone, as an example. Other than the smart phone, the present invention is favorably applicable to any portable device such as a portable game device, a feature phone, a portable information terminal, a PDA, or a laptop personal computer as long as the device can be carried. Further, even a terminal device such as a desktop personal computer, which is not convenient to carry can also be used as the terminal device 200.

According to FIG. 4, the terminal device 200 includes the display 211, a processor 212, a sensor 213 including a GPS sensor 214, a gyro sensor 215, an acceleration sensor 216, a communication unit including the wireless communication processing circuit 217 and an antenna 218, a memory 219 including a RAM, a ROM, a non-volatile memory (and an HDD in some cases), and the like, and an input interface 220 configured from a touch panel 221 and a hard key 222. Then, these components are electrically connected with one another through a control line and a data line.

The display 211 functions as a display unit that reads out image information stored in the memory 219 and performs various types of display, according to an instruction of the processor 212. The display 211 is configured from a liquid crystal display, for example.

The input interface 220 is configured from the touch panel 221 and/or the hard key 222, and the like, and functions as an operation unit that receives various instructions and inputs from the user. The touch panel 221 is arranged to cover the display 211 and outputs information of position coordinates corresponding to image data displayed on the display 211 to the processor 212. As a touch panel system, a known system such as a resistive film system, a capacitive coupling system, or an ultrasonic surface acoustic wave system can be used. In the present embodiment, the touch panel 221 detects a swipe operation or a tap operation to the items displayed on the display 211 with an indicator.

The processor 212 is configured from the CPU (microcomputer), and functions as a control unit that controls other connected components on the basis of various programs stored in the memory 219. To be specific, the processor 212 reads out a program for executing the game application according to the present embodiment and a program for executing an OS from the memory 219, and executes the programs. Further, the processor 212 generates various types of operation information on the basis of an output from the touch panel 221. Note that the processor 212 may be configured from a single CPU or may be configured from a plurality of CPUs. Further, the processor 212 may be configured from an appropriate combination of other types of processors such as a GPU specialized in image processing.

The memory 219 is configured from the ROM, the RAM, the non-volatile memory, the HDD, and the like, and functions as a storage unit. The ROM stores the program for executing the game application according to the present embodiment and the OS. The RAM is a memory used for writing and reading of data while various commands generated by execution of the programs stored in the ROM are processed by the processor 212. The non-volatile memory is a memory to/from which writing and reading of data are executed by execution of the programs, and the data written here is stored after the execution of the programs is terminated. In the present embodiment, the memory 219 receives the various types of information stored in FIGS. 5A to 5E from the server device 100 and at least temporarily stores the information, and at least temporarily stores information transmitted to the server device 100 to update the information of FIGS. 5A to 5E, according to the progress of the game application.

The wireless communication processing circuit 217 performs modulation and demodulation processing for transmitting and receiving information to/from the remotely installed server device 100 and other terminal devices through the connected antenna 218. For example, the wireless communication processing circuit 217 performs processing for receiving the program for executing the game application according to the present embodiment, various types of information used in the application, and the like from the server device 100 according to the progress of the application. Further, the wireless communication processing circuit 217 performs processing for transmitting a result of the processing through the execution of the application to the server device 100.

The wireless communication processing circuit 217 is processed on the basis of a broad-band wireless communication system represented by a wideband-code division multiple access (W-CDMA) system. However, the wireless communication processing circuit 217 can be processed on the basis of a narrow-band wireless communication system such as a wireless LAN represented by IEEE 802. 11 or Bluetooth (registered trademark).

The wireless communication processing circuit 217 and the antenna 218 configure a communication unit. Note that wired communication can be used in place of or in addition to the wireless communication. In this case, a communication processing unit for the wired communication is provided in place of or in addition to the wireless communication processing circuit 217.

4. Information Stored in HDD 116 of Server Device 100

FIG. 5A is a diagram conceptually illustrating a unit game arrangement information table stored in the server device 100 according to the first embodiment of the present disclosure. The server device 100 stores the information in the HDD 116 (and/or the memory 111). To be specific, information that indicates an arrangement position of a unit game, and the like, of the first items virtually arranged in association with predetermined positions in the real world, is stored in the unit game arrangement information table. Note that, in the present embodiment, the user will be able to play a provided unit game when the user acquires the unit game arranged as the first item, in other words, when the unit game is provided to the user.

Referring to FIG. 5A, at least position information and arrangement period information are stored in the HDD 116 of the server device 100 in association with a unit game ID for identifying the unit game virtually arranged as the first item. In the present embodiment, the unit game virtually arranged within a predetermined distance from a current position of the terminal device of the user is provided to the user. The position information is information that indicates a point in the real world associated with the unit game. Examples of the position information include information of latitude and longitude and information that indicates a specific landmark (a station, a city hall, or the like) in the real world. The arrangement period information is information that indicates time during which the user can acquire the unit game, that is, the time during which the unit game can be provided to the user. If the arrangement position of the unit game is positioned within the predetermined distance from the terminal device of the user within the period specified with the arrangement period information, the user can acquire the unit game, in other words, the unit game can be provided to the user. Note that, in the present embodiment, when the unit game is provided to the user, the user who is provided the unit game will be able to play the unit game.

The position information is not necessarily fixed on a constant basis, and can be randomly or arbitrarily changed after a lapse of a predetermined time.

FIG. 5B is a diagram conceptually illustrating a part arrangement information table stored in the server device 100 according to the first embodiment of the present disclosure. The server device 100 stores the information in the HDD 116 (and/or the memory 111). To be specific, information that indicates an arrangement position of a part, of the first items virtually arranged in association with predetermined positions in the real world, is stored in the part arrangement information table. Note that, in the present embodiment, when the user acquires a part arranged as the first item, in other words, when the part is provided to the user, the part becomes usable as one element that configures a unit game that is newly created by the user himself/herself.

Referring to FIG. 5B, at least position information and arrangement period information are stored in the HDD 116 of the server device 100 in association with a part ID for identifying the part virtually arranged as the first item. The position information is information that indicates points in the real world in association with the first items. Examples of the position information include information of latitude and longitude and information that indicates a specific landmark (a station, a city hall, or the like) in the real world. The arrangement period information is information that indicates time during which the user can acquire the part, that is, the time during which the part can be provided to the user. If the virtual arrangement position of the part is positioned within the predetermined distance from the terminal device of the user within the period specified with the arrangement period information, the user can acquire the part, in other words, the part can be provided to the user.

Note that the position information is not necessarily fixed on a constant basis, and can be randomly or arbitrarily changed after a lapse of a predetermined time.

FIG. 5C is a diagram conceptually illustrating a unit game information table stored in the server device 100 according to the first embodiment of the present disclosure. The server device 100 stores the information in the HDD 116 (and/or the memory 111). Elements that configure the unit game are stored in the unit game information table in association with the unit game ID.

In the present embodiment, as an example, an individual unit game is configured from a background object, a wall object, and a floor object, and an enemy character serving as an opponent in the unit game is identified. Therefore, the unit game information table stores background information, wall information, floor information, and enemy character information in association with the individual unit game ID. As the background information, the wall information, and the floor information, part IDs for respectively identifying the background object, the wall object, and the floor object that are drawn as a background that configures the unit game are stored. For example, when a specific unit game is specified by the user, the information is transmitted to the terminal device 200, and the objects identified with the part IDs are drawn as the background when the unit game is executed. Further, the enemy character information is a part ID for identifying the enemy character appearing in the unit game. When the unit game is executed, a character information table (not illustrated) is referred. Then, an enemy character having a predetermined ability value is generated on the basis of the part ID stored in the enemy character information, and is used as the enemy character of the unit game.

FIG. 5D is a diagram conceptually illustrating a part information table stored in the server device 100 according to the first embodiment of the present disclosure. The server device 100 stores the information in the HDD 116 (and/or the memory 111). Attribute (type) information is stored for each part ID in the part information table.

FIG. 5E is a diagram conceptually illustrating a user information table stored in the server device 100 according to the first embodiment of the present disclosure. The server device 100 stores the information in the HDD 116 (and/or the memory 111). User name information, provided part information, current place information, and a released unit game ID are stored for each user ID that identifies each user in the user information table.

In the present embodiment, the unit game and the part virtually arranged within a predetermined distance from the current position of the terminal device of the user are provided to the user. Therefore, in the present embodiment, the user information table is mainly used to manage the unit game ID that is released when the unit game is provided, for each user. In addition, the user information table is used to manage the number of acquired parts, for each user.

5. Processing Sequence Between Server Device 100 and Terminal Device 200

Figure 6:
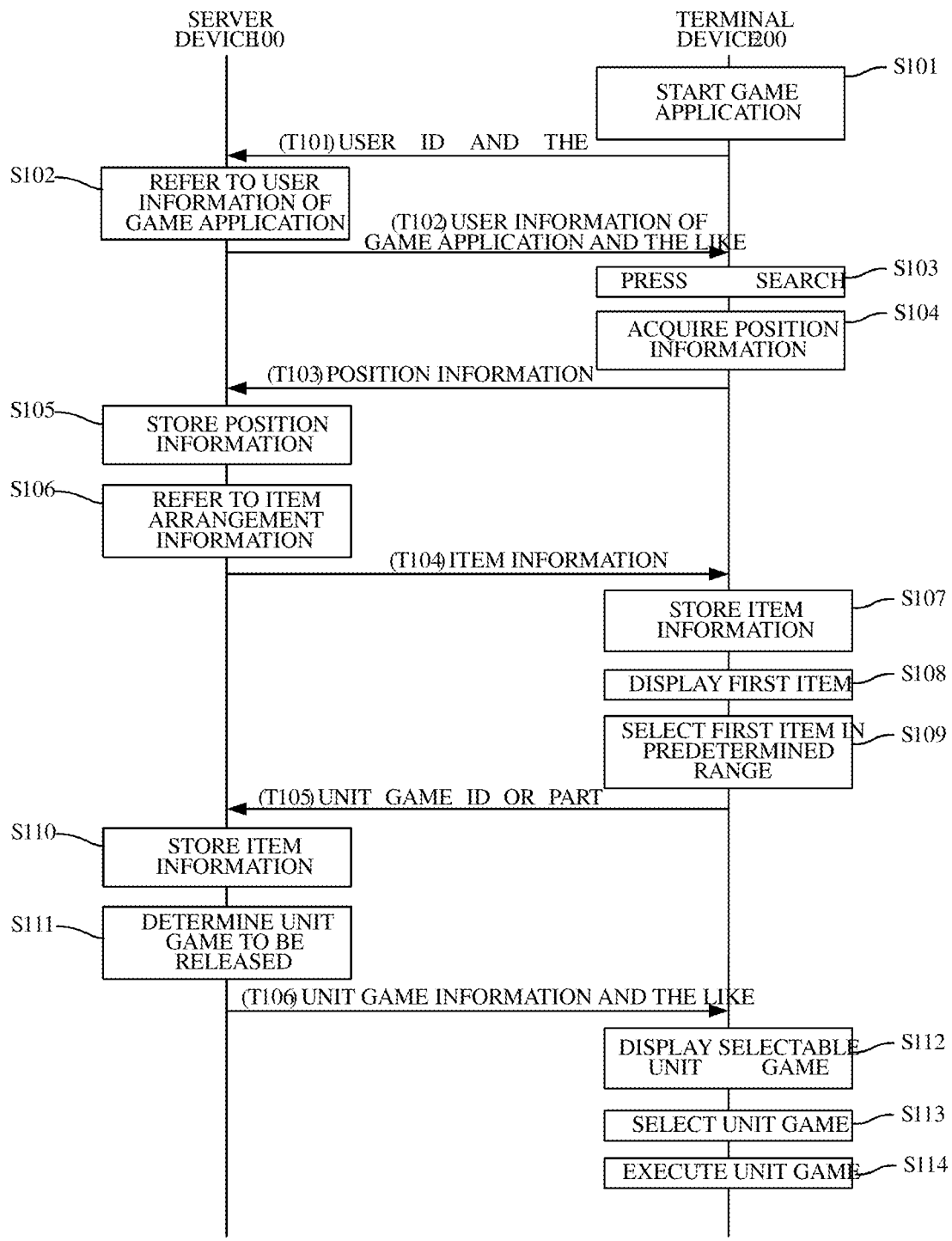
FIG. 6 is a diagram illustrating a processing sequence between the server device and the terminal device according to the first embodiment of the present disclosure.

FIG. 6 is a diagram illustrating a processing sequence between the server device 100 and the terminal device 200 according to the first embodiment of the present disclosure. According to FIG. 6, when start of the game application according to the present embodiment is instructed in the terminal device 200 (S101), the terminal device 200 transmits a transmission request (T101) of the user IDs associated with the users and the user information associated with the user IDs to the server device 100. The processor 112 of the server device 100 that has received the transmission request refers to the user information table of the game application exemplarily illustrated in FIG. 5E (S102), and transmits various types of information (T102) necessary for execution of the game application, such as the user name information associated with the user ID, to the terminal device 200.

Then, the terminal device 200 detects whether a search icon displayed on the display 211 has been pressed by the user (S103) after the game application is executed (S103). The search icon is an icon for instructing, from the server device 100, the acquisition of the first items associated with peripheral points of the current position of the terminal device 200 in the real world held by the user. When the icon is pressed (S103), the terminal device 200 acquires position information (for example, coordinate information) that identifies the current place of the terminal device 200 in the real world on the basis of the GPS sensor 214, for example (S104), and transmits the position information (T103) to the server device 100.

When the server device 100 receives the current place information, the server device 100 stores the current place information in association with the user ID, as the user information illustrated in FIG. 5E (S105). After that, the server device 100 extracts one or a plurality of the first items associated with points existing within a predetermined range (for example, "m" km) from the point identified with the received current place information by reference to the unit game arrangement information table and the part arrangement information table illustrated in FIGS. 5A and 5B (S106). Then, the server device 100 transmits the item information (T104) corresponding to the extracted first items to the terminal device 200.

Figure 7:
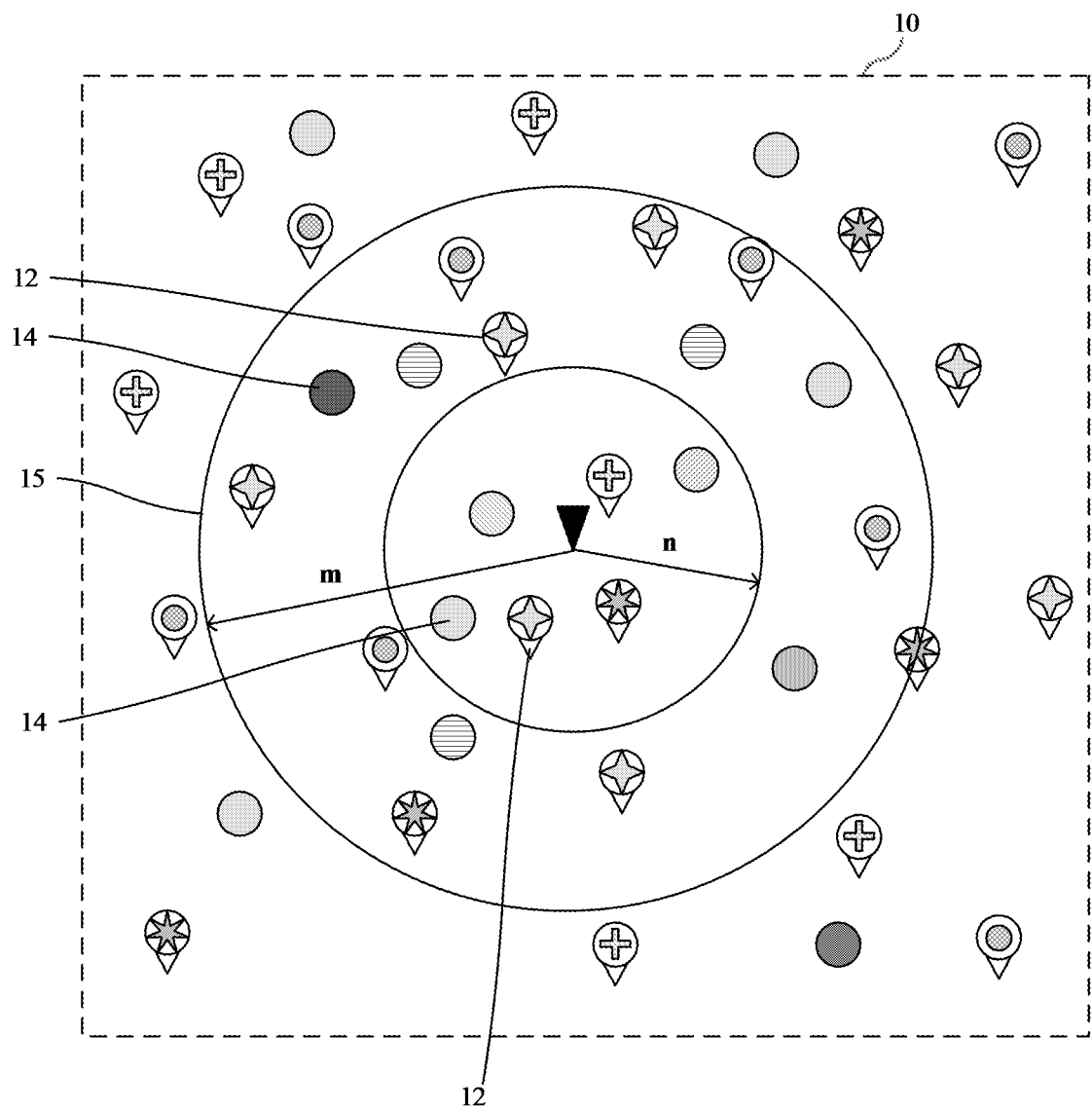
FIG. 7 is a diagram conceptually illustrating positional relationship among first items extracted by the server device according to the first embodiment of the present disclosure.

Here, FIG. 7 is a diagram conceptually illustrating positional relationship among the first items extracted by the server device 100 according to the first embodiment of the present disclosure. According to FIG. 7, the unit games 12 and the parts 14 are arranged in association with predetermined points in the real world, in the virtual game space 10 associated with the real world. Among the first items, the first items existing within a predetermined distance ("m" km) (within the circle illustrated by the sign 15) from the position of the terminal device 200 in the real world are the first items extracted in S106 of FIG. 6 above.

Next, referring back to FIG. 6, when the terminal device 200 receives the item information, the terminal device 200 stores the received item information in the memory 219 (S107). Then, the terminal device 200 arranges the unit games 12 and the parts 14 together with the current place 11 of the terminal device 200 in the real world, on a game application execution screen of the display 211 on the basis of the position information included in the item information (S108).

Figure 8:
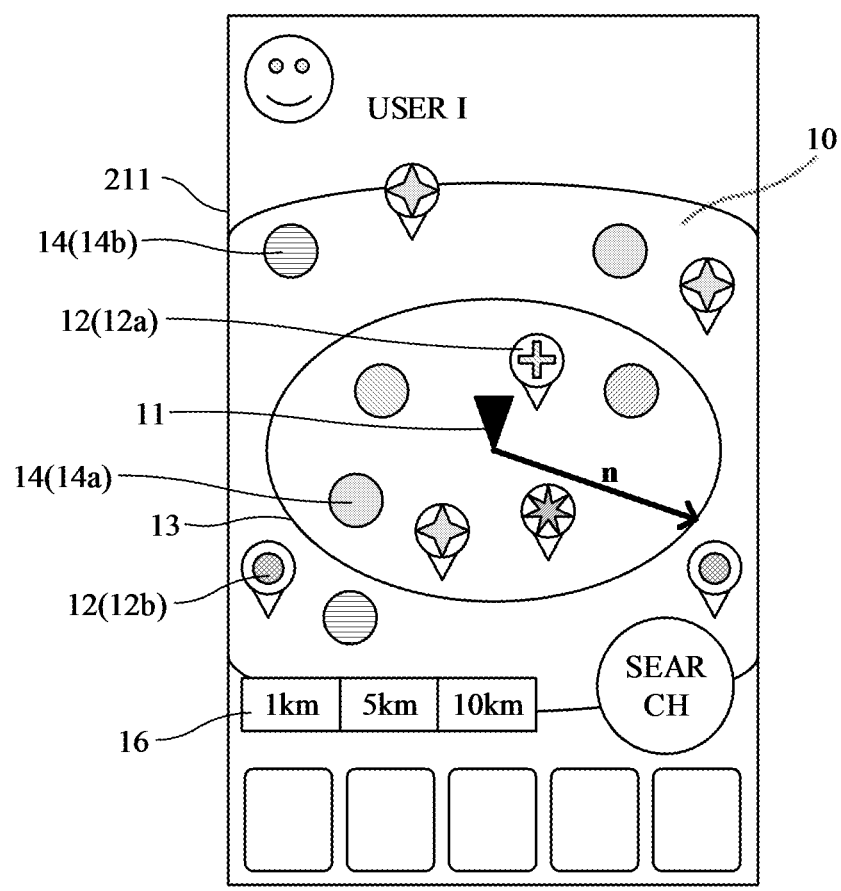
FIG. 8 is a diagram illustrating an example of a screen displayed on a display of a terminal device.

Here, FIG. 8 is a diagram illustrating an example of the screen displayed on the display 211 of the terminal device 200. According to FIG. 8, positional relationship between the position of the terminal device 200 in the real world and the predetermined points identified with the received item information are displayed on the display 211 of the terminal device 200 in a recognizable manner. To be specific, a map of the real world is displayed on the display 211, placing the current place 11 of the terminal device 200 in the real world in the center. Then, the unit games 12 and the parts 14 associated with the positions in the real world identified on the basis of the received item information are superimposed on the map and displayed. Further, the range object 13 that indicates the range (within "n" km from the current position of the terminal device 200 in the real world) of the first items acquirable by the selection operation of the user is displayed.

As illustrated in FIGS. 5A and 5B, the arrangement period information that indicates the period in which the user can acquire the first items can be stored in the first items. When the arrangement period information is stored in association with the item IDs (the unit game IDs or the part IDs), the first items are displayed together with the arrangement period information. Further, the current map displays the range of a radius of 5 km. However, the range to display can be appropriately enlarged or reduced with a range specification icon 16.

Referring back to FIG. 6, while only the unit game or the part (the unit games 12*a* and the parts 14*a* in FIG. 8) existing in the predetermined range ("n" km, for example. Note that n<m), from among the first items displayed in S108, are acquirable by the selection operation of the user, the terminal device 200 receives a tap operation by the user on the touch panel 221 (S109), and transmits information (the unit game ID or the part ID: T105) that identifies the first item arranged on the position of the tap coordinates to the server device 100.

The server device 100 stores the received unit game ID or part ID in association with the user ID of the user who is executing the game application (S110). To be specific, as illustrated in FIG. 5E, when the server device 100 receives the unit game ID, the server device 100 stores the unit game ID as the released game information (S110 and S111). Further, when the server device 100 receives the part ID, the server device 100 stores the number of the items acquired so far, for each part ID (S110). Next, the server device 100 transmits the unit game ID stored as the released game information to the terminal device 200. Then, the terminal device 200 displays the unit game ID as the unit game selectable and executable by the user, and executes the unit game upon selection by the user (S112 to S114).

6. Processing Flow of Game Application in Server Device 100

Figure 9:
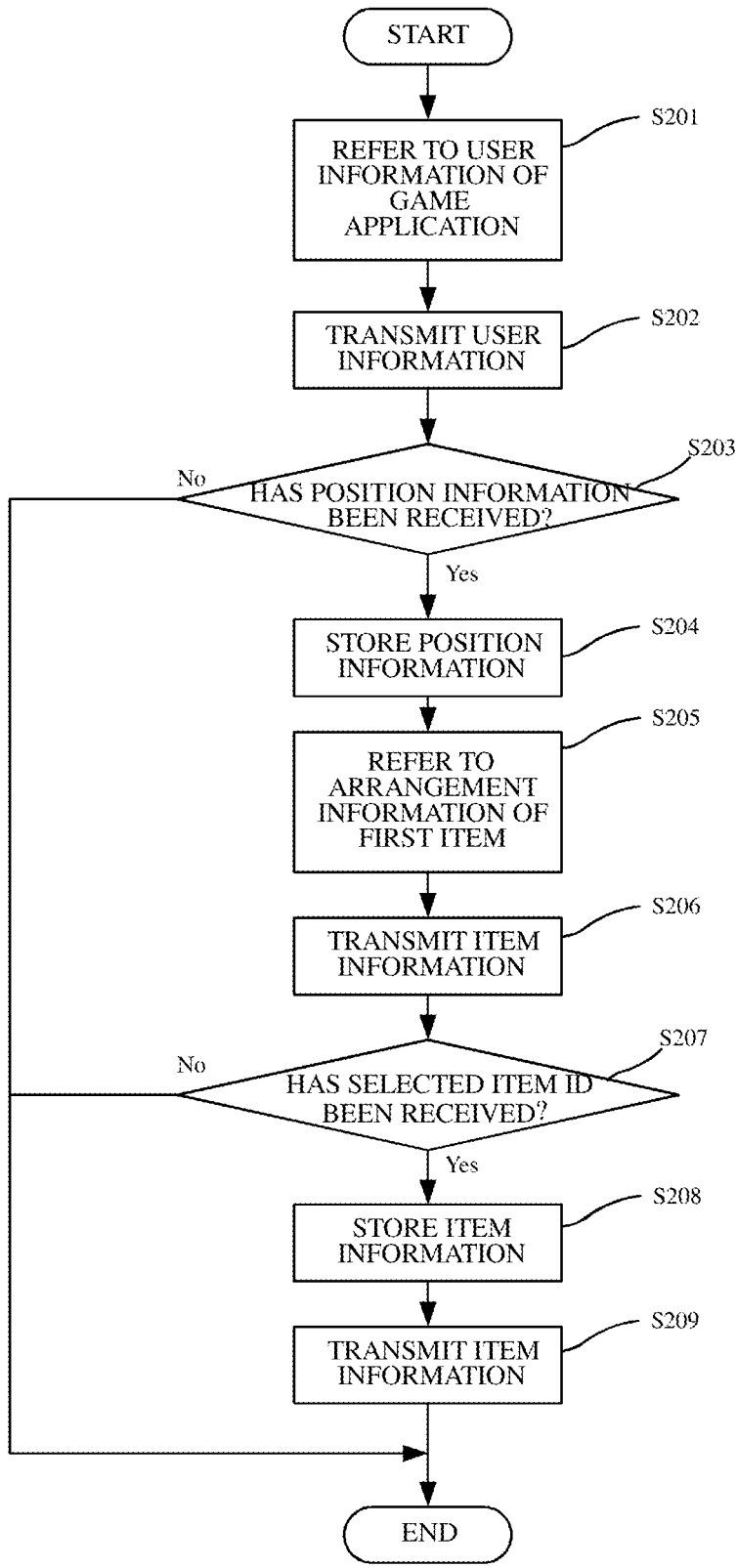
FIG. 9 is a diagram illustrating a processing flow executed in the server device.

FIG. 9 is a diagram illustrating a processing flow executed in the server device 100. To be specific, FIG. 9 is a diagram illustrating a processing flow performed in the server device 100 on the basis of the program stored in the memory 111 when the game application according to the present embodiment is performed in the terminal device 200.

The processing flow illustrated in FIG. 9 is started when the game application is started in the terminal device 200, and the user ID and the transmission request of the user information of the game application transmitted from the terminal device 200 are received by the communication processing circuit 117.

The processor 112 identifies the user information corresponding to the received user ID by reference to the user information table of the game application illustrated in FIG. 5E on the basis of the information received in the communication processing circuit 117 (S201). The processor 112 transmits the identified user information to the terminal device 200 through the communication processing circuit 117 (S202). Then, the processor 112 stands by for the progress of the processing flow until the processor 112 receives, from the terminal device 200, the position information that indicates the current place of the terminal device 200 in the real world detected by the GPS sensor 214 with the execution of the game application (S203).

Then, when the processor 112 receives the current place information from the terminal device 200 (S203), the processor 112 stores the received current place information in association with the user ID information in the user information table (FIG. 5E) in the HDD 116 (S204). Next, the processor 112 identifies the first items (the unit games and the parts) stored in association with the points existing within the predetermined range ("m" km) from the point identified with the current place information by reference to the unit game arrangement information table (FIG. 5A) and the part arrangement information table (FIG. 5B) (S205). Next, the processor 112 transmits the item information (FIG. 5A) of the identified unit games and the item information (FIG. 5B) of the identified parts to the terminal device 200 through the communication processing circuit 117 (S206).

Then, the processor 112 stands by for the progress of the processing flow until the processor 112 receives, from the terminal device 200, IDs (the unit game IDs and the part IDs) of one or the plurality of first items acquired from among the transmitted first items upon selection by the user (S207). The processor 112 counts and stores the number of parts acquired so far, for each part ID, when the processor 112 receives the part ID, and stores the unit game ID as the unit game information for releasing the unit game ID when the processor 112 receives the unit game ID (S208). Next, the processor 112 transmits the item information of various items necessary for the execution of the game application to the terminal device 200 (S209). Especially, when the processor 112 receives the unit game ID, the processor 112 performs control to transmit the unit game information to the terminal device 200 after the above-described storage. The processing flow at the time of acquisition of the items executed in the server device 100 is terminated.

7. Processing Flow at Unit Game Creation Mode in Terminal Device 200

In the present embodiment, the first items (the unit game and the part) can be provided to the user on the basis of the current place of the terminal device 200, as described above in the processing flow of FIG. 9. The user who is provided the unit game can select and execute the unit game associated with the unit game ID. Meanwhile, when the part is provided, the server device 100 counts the number of the parts, for each provided part ID, and the user himself/herself can create the new unit game, by using the provided part.

Figure 10:
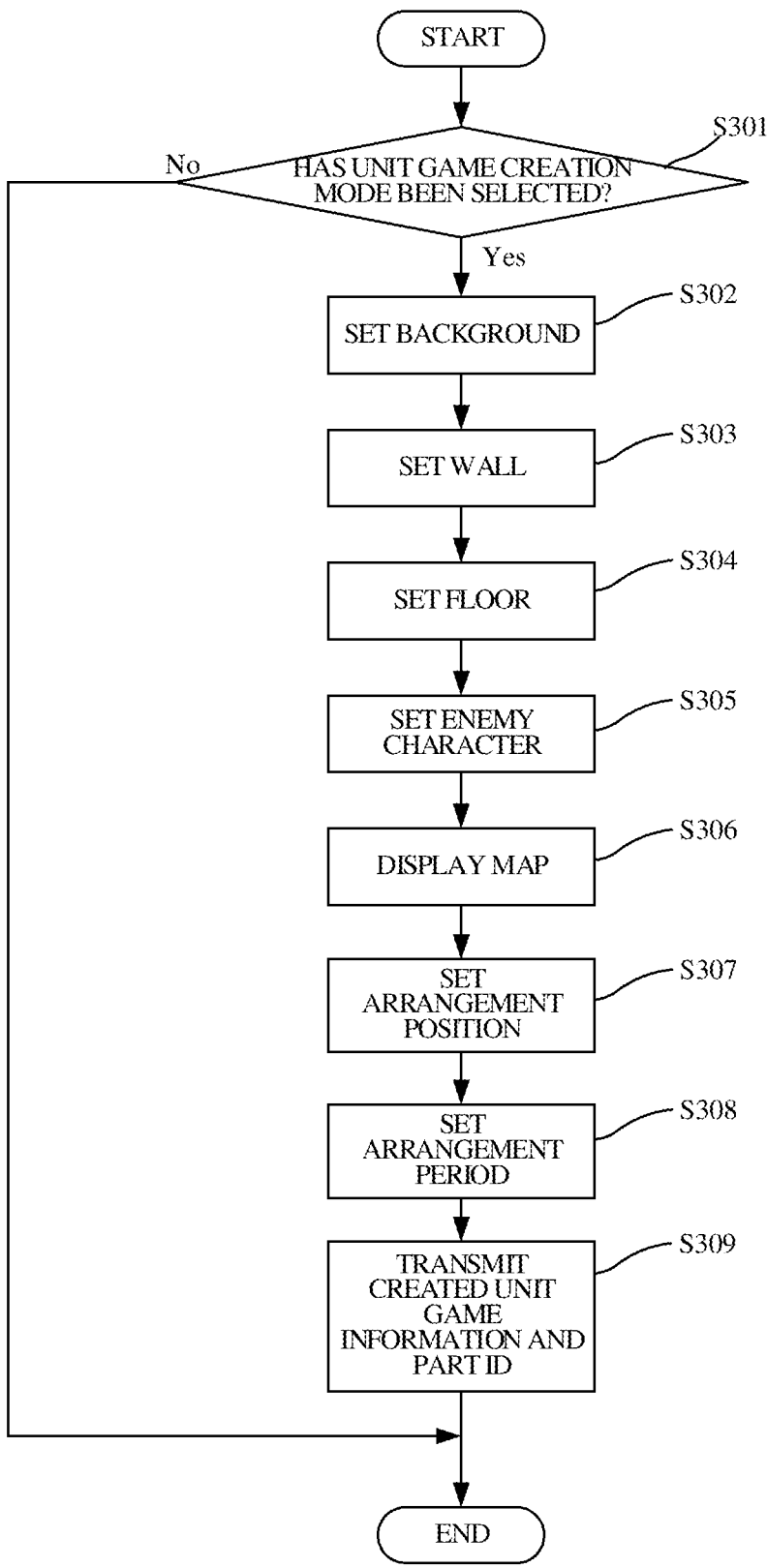
FIG. 10 is a diagram illustrating a processing flow executed in the terminal device.

FIG. 10 is a diagram illustrating a processing flow executed in the terminal device 200. To be specific, FIG. 10 illustrates a processing flow executed by the processor 212 on the basis of the program stored in the memory 219 in a unit game creation mode in which the user himself/herself creates the unit game. Note that, in the present embodiment, the unit game created by the user himself/herself is referred to as a second item.

The processing flow is started when the game application according to the present embodiment is instructed to launch by the user. After that, as illustrated in FIG. 6, transmission processing of the user ID information and the like and reception processing of the user information of the game application are performed. However, those processing is omitted in FIG. 10. First, the processor 212 determines whether the unit game creation mode has been selected by the user or not (S301). Although not illustrated, when the unit game creation mode has not been selected, the processor 212 determines that a unit game execution mode has been selected by the user, and the processor 212 displays, on the display 211, a selection screen of the unit games to be executed, and performs control to execute the unit game selected by the user.

In the present embodiment, as illustrated in FIG. 5C, the individual unit game is configured from the parts such as the background object, the wall object, and the floor object, and the enemy character serving as an opponent in the unit game is identified as the part. Therefore, when the unit game creation mode is selected in S301, the processor 212 identifies the number of parts acquired by the user by reference to the user information received from the user information table of the server device 100. Then, the processor 212 displays, on the display 211, a selection screen of the background objects, and sets the selected part (background object) as the part (background object) that configures the unit game, according to selection of the user (S302). The processor 212 performs control to temporarily store the part ID corresponding to the set part (background object) in the memory 219.

Figure 11A:
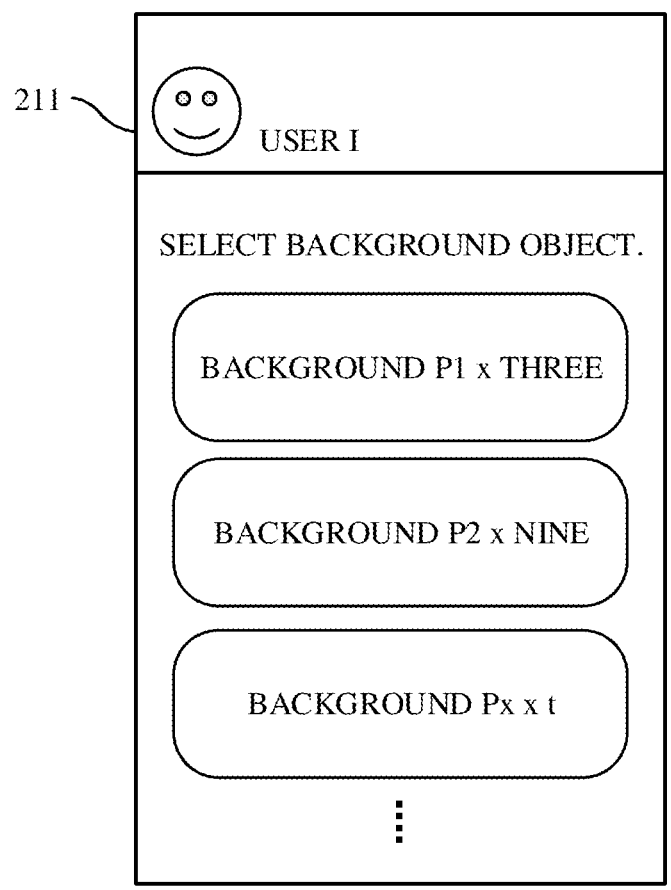
FIG. 11A is a diagram illustrating an example of a screen displayed on a display of a terminal device.

FIG. 11A is a diagram illustrating an example of a screen displayed on the display 211 of the terminal device 200. To be specific, FIG. 11A is an example illustrating the selection screen of the parts (background objects). In the user information table (FIG. 5E), the numbers of P1 to Pn are stored as the parts acquired so far, that is, provided so far, for a user I. Therefore, FIG. 11A displays a selection icon of the background P1, a selection icon of the background P2, and the like, according to the information stored in the user information table. The processor 212 sets the selected part (background object) as the part (background object) that configures the second item (unit game) to be newly created, on the basis of the user operation detected on the touch panel 221 superimposed and arranged on the display 211. The processor 212 performs control to temporarily store the part ID corresponding to the set part (background object) in the memory 219.

Figure 11B:
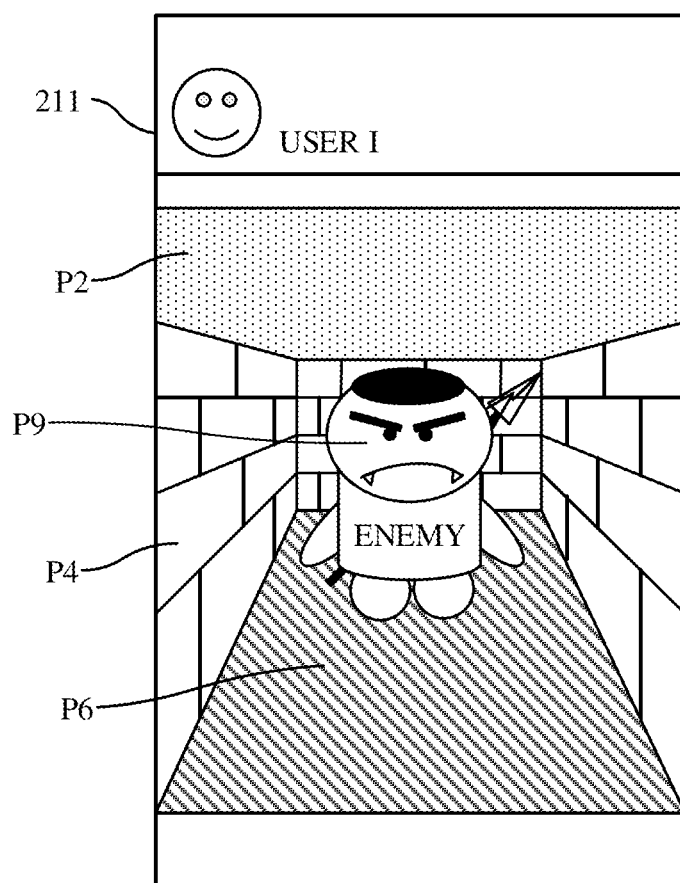
FIG. 11B is a diagram illustrating an example of a screen displayed on a display of a terminal device.

Referring back to FIG. 10, in S303 to S305, setting of other parts, that is, the wall object, the floor object, and the enemy character is performed similarly to the setting of the background object described above. FIG. 11B is a diagram illustrating an example of the screen displayed on the display 211 of the terminal device 200. To be specific, FIG. 11B illustrates an example of the unit game configured from the parts (the background object, the wall object, the floor object, and the enemy object) set in S302 to S305. Referring to FIG. 11B, "P2" as the background object, "P4" as the wall object, "P6" as the floor object, and "P9" as the enemy character are set as the parts that configure the newly created unit game, from among the parts stored in association with the user ID of the user himself/herself.

Referring back to FIG. 10, when the setting of the parts is terminated, the processor 212 performs control to display the map of the real world on the display 211 (S306). Then, when the processor 212 detects the selection operation by the user of an arbitrary point on the map on the touch panel 221, the processor 212 sets the selected point as the arrangement position of the unit game created in S302 to S305 and stores the arrangement position in the memory 219 (S307). Further, the processor 212 performs control to display the selection screen of the arrangement period of the unit game on the display 211. Then, when the processor 212 detects the selection operation by the user on the touch panel 221, the processor 212 sets the selected period as the arrangement period of the unit game and stores the arrangement period in the memory 219 (S308).

Next, the processor 212 performs control to transmit the second item (unit game) newly created by the user, that is, the unit game information and the part IDs that identify the parts used in the creation of the unit game stored in the memory 219 in the process of S302 to S308 to the server device 100 (S309). The processing flow in the unit game creation mode is terminated.

8. Processing Flow at Unit Game Creation in Server Device 100

Figures 12, 13A:
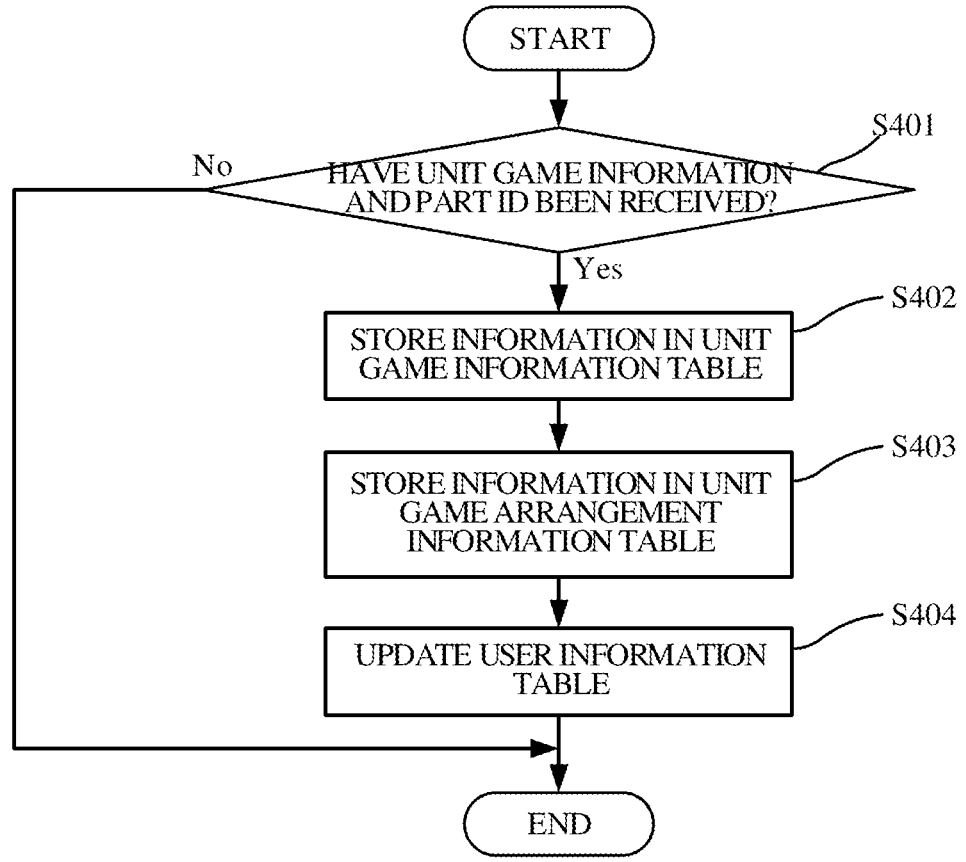
FIG. 12 is a diagram illustrating a processing flow executed in the server device.
FIG. 13A is a diagram conceptually illustrating a unit game information table stored in the server device according to the first embodiment of the present disclosure.

FIG. 12 is a diagram illustrating a processing flow executed in the server device 100. To be specific, FIG. 12 illustrates a processing flow executed on the basis of the program stored in the memory 111 when the second item (unit game) is newly created by the user himself/herself by the processing flow of FIG. 10, and the created unit game information and the part ID are received from the terminal device 200.

Referring to FIG. 12, the processor 112 of the server device determines whether the processor 112 has received the newly created second item (unit game information) and the part IDs (S401). Then, when the processor 112 has received the unit game information and the part IDs, the processor 112 performs control to store the set background information, wall information, floor information, and enemy character information in association with the unit game ID that identifies the created unit game, to the unit game information table stored in the HDD 116, on the basis of the received unit game information (S402). Next, the processor 112 performs control to store the arrangement position information and the arrangement period information of the created unit game, to the unit game arrangement information table stored in the HDD 116, on the basis of the received unit game information (S403).

FIG. 13A is a diagram conceptually illustrating the unit game information table stored in the server device 100 according to the first embodiment of the present disclosure. Further, FIG. 13B is a diagram conceptually illustrating the unit game arrangement information table stored in the server device 100 according to the first embodiment of the present disclosure. To be specific, the unit game information table (FIG. 13A) and the unit game arrangement information table (FIG. 13B) after the information is stored by the processor 112 in S402 and S403 of FIG. 12 are illustrated.

Referring to FIG. 13A, "Gx" is added as a newly created unit game ID, and "P2" as the background information, "P4" as the wall information, and "P6" as the floor information, and "P9" as the enemy character are stored in association with the unit game ID "Gx" in the unit game information table. Further, referring to FIG. 13B, "(Nx, Ex)" as the arrangement position in the real world and "9:00 AM to 9:00 PM" as the arrangement period are stored in association with the newly created unit game ID "Gx" in the unit game arrangement information table.

Referring back to FIG. 12, the processor 112 identifies the parts used in the newly created unit game on the basis of the part IDs received in S401, and performs processing of subtracting the identified parts from the user information table (S404). The processing flow at the creation of the unit game in the server device 100 is terminated.

Figure 14:
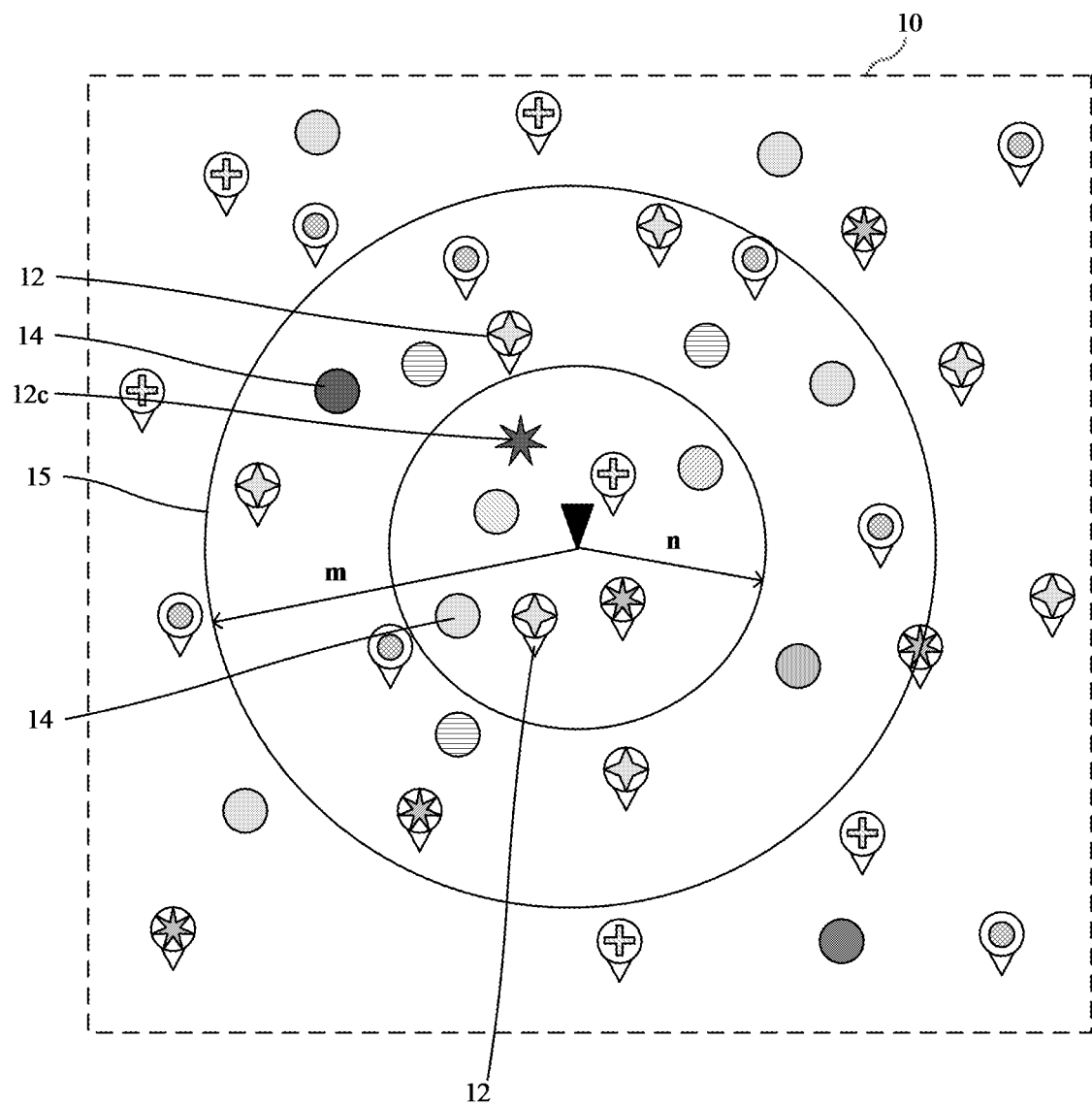
FIG. 14 is a diagram conceptually illustrating positional relationship among first items extracted by the server device according to the first embodiment of the present disclosure.

FIG. 14 is a diagram conceptually illustrating positional relationship among the items extracted by the server device 100 according to the first embodiment of the present disclosure. To be specific, FIG. 14 is a diagram conceptually illustrating the positional relationship among the items after the information related to the newly created second item (unit game) is stored in the unit game information table (FIG. 13A) and the unit game arrangement information table (FIG. 13B) by the processing of S402 and S403 of FIG. 12.

Referring to FIG. 14, a unit game 12c that is the newly created second item is added in the virtual game space 10 in comparison with the example of FIG. 7 before the second item is created.

Figure 15:
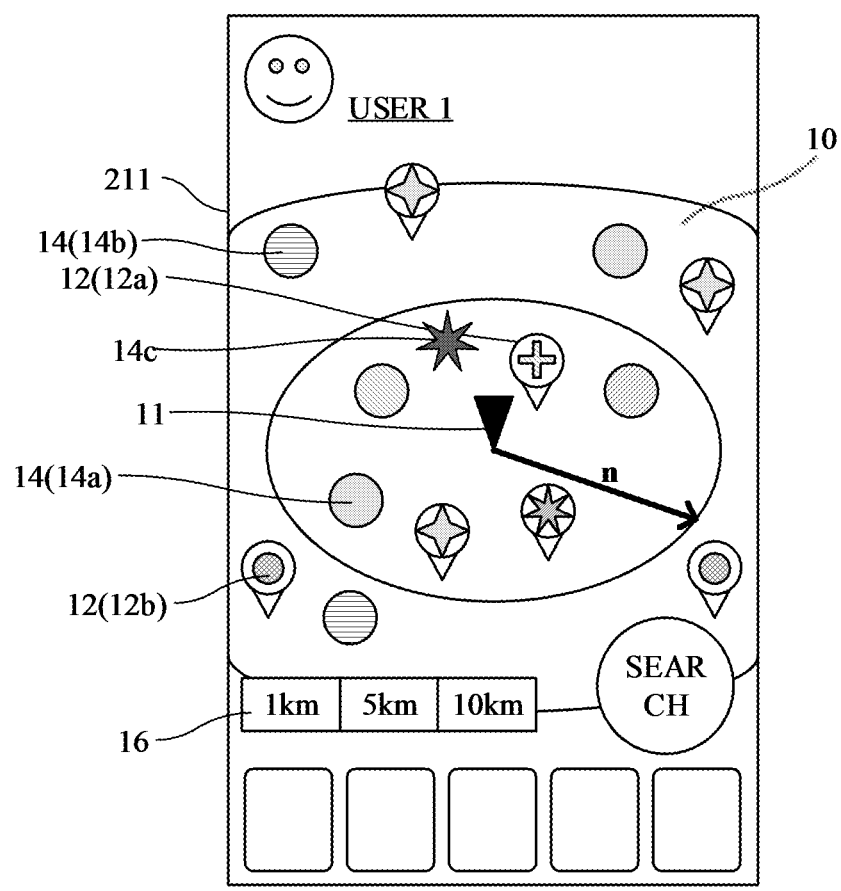
FIG. 15 is a diagram illustrating an example of a screen displayed on a display of a terminal device.

Further, FIG. 15 is a diagram illustrating an example of the screen displayed on the display 211 of the terminal device 200. To be specific, FIG. 15 illustrates an example of the screen displayed in S108 of FIG. 6, and the screen is displayed when the game application is executed, after the game application is executed after the information related to the newly created second item (unit game) is stored in the unit game information table (FIG. 13A) and the unit game arrangement information table (FIG. 13B) by the processing of S402 and S403 of FIG. 12.

Referring to FIG. 15, the unit game 12c that indicates the newly created second item is added in the virtual game space 10 in comparison with the example of FIG. 8 before the second item is newly created. Therefore, a unit game Gx is released when the user selects the unit game 12c, and execution of the unit game Gx becomes selectable by the user (S112 and S113).

As described above, in the present embodiment, the first item is provided to the user according to the current place of the terminal device, and the user himself/herself can create the second item (unit game), using the provided first item. Therefore, the user can execute not only the unit game prepared in advance but also the unit game created by the user, and a more enjoyable item can be provided to the user.

Second Embodiment

In the first embodiment, the example of the system 1 including the server device 100 and the terminal device 200 has been described. However, in a second embodiment, a system in which a plurality of terminal devices is connected to a server device 100 through a network 300 will be described. Note that the present embodiment has similar configurations, processing, and procedures to the first embodiment except for points to be specifically described below. Therefore, detailed description of such matters is omitted.

In the present embodiment, a plurality of terminal devices is connected to the server device 100 through the network 300, as described above. Therefore, when a game application according to the present embodiment is executed in each of the terminal devices, the terminal devices refer to a unit game arrangement information table (FIG. 5A), a part arrangement information table (FIG. 5B), a unit game information table (FIG. 5C), a part information table (FIG. 5D), and a user information table (FIG. 5E) stored in the server device 100.

Therefore, when a new second item (unit game) is created according to a processing flow described in FIG. 10, and information related to the second item (unit game), which is created according to a processing flow described in FIG. 12, is stored in the tables, in one terminal device, the created unit game can be arranged in another terminal device and can be provided to a user of the another terminal device. That is, after a processor 112 of the server device 100 receives a newly created second item (unit game), the processor 112 transmits the unit game to the another terminal device in a providable manner according to a current place when the game application is executed in the another terminal device.

As described above, in the present embodiment, the item is provided to the user according to the current place of the terminal device, and the user can newly create the unit game, using the provided item. With this configuration, the user can execute not only the unit game prepared in advance but also the unit game created by another user, and a more enjoyable item can be provided to the user.

Third Embodiment

In the first embodiment, the unit game has been exemplified as the second item, and the system that enables the user to newly create the unit game has been described. However, in a third embodiment, a character used in a game application is also used as a second item, in addition to a unit game.

That is, in the third embodiment, a character information table is newly stored in addition to a unit game information table illustrated in FIG. 5C. In the character information table, parts (for example, "face" information, "body" information, and "weapon" information) that configure the character are stored in association with a character ID that identifies the character. Further, parts ID corresponding to the aforementioned parts are added to and stored in a part arrangement information table illustrated in FIG. 5B together with arrangement position information and arrangement periods of the parts.

In a terminal device 200, a user himself/herself can create a new second item (character), appropriately setting a first item (part) from among acquired first items (parts), for each part that configures the character, similarly to the example of FIG. 10. Further, the created new character is transmitted to a server device 100 and is updated and stored in the character information table by a processor 112, and is usable as a user character or an enemy character in creating a unit game, for example.

As described above, in the present embodiment, the item is provided to the user according to a current place of the terminal device, and the user can newly create a character, using the provided item. Therefore, the user can execute not only the character prepared in advance but also the character created by the user, and a more enjoyable item can be provided to the user.

Modification

In the first to third embodiments, the case of creating the second item (for example, the unit game or the character) from the first item (for example, the part item) provided to the user has been described. However, an embodiment is not limited thereto, a provided first item may be further converted or processed into another item or object, and a second item may be created on the basis of the converted or processed item or object. Further, the second item may be created by combining the first item with another item different from the first item. That is, the second items created on the basis of the provided first item include:

a second item created only from the first item;
a second item created in a manner such that the first item is converted or processed into another item, and the second item is created using the created item;
a second item created in a manner such that another item is combined with the first item, and the second item is created using the created item; and
a second item created in a manner such that another item is combined with the first item, the combined item is further converted or processed into another item, and the second item is created using the another item.

In other words, any second item created on the basis of the provided first item may be employed as long as the first item is used in any stage of the process in creating the second item.

In the first to third embodiments, when the user himself/herself creates the second item, the user himself/herself can select the arrangement position and the arrangement period of the created second item. However, at least either the arrangement position or the arrangement period may be randomly selected on the system side (server device 100).

In the first to third embodiments, the arrangement period information has been stored in the unit game arrangement information table and the part arrangement information table. However, the items may be constantly arranged on the basis of predetermined position information without storing the arrangement period information.

In the first to third embodiments, the unit game and the character have been exemplified as the second items. However, an embodiment is not limited thereto, and a virtual game space itself, equipment usable by the character, and the like may be able to be created by using the first item acquired by the user.

In the first to third embodiments, the GPS sensor 214 of the terminal device 200 has been used in the acquisition of the position information. However, an embodiment is not limited to the acquisition of the position information with the GPS sensor 214, and position information obtained from a wireless communication network such as Wi-Fi or LTE, or relative position change information obtained from the gyro sensor 215 or the acceleration sensor 216 can be acquired and used. That is, as the position information, any known information can be used.

Further, in the first to third embodiments, the acquisition of the position information is executed at the timing when the search icon is pressed. However, the timing of the acquisition of the position information is not limited to the timing of the pressing of the search icon. For example, the position information may be automatically acquired at the timing when the game application is started. Alternatively, the position information may be automatically acquired at predetermined intervals (every hour, for example).

In the above-described embodiments, the tap operation and the swipe operation on the touch panel 221 have been exemplarily described as the selection operations of the first items. However, the selection operations are not limited to these operations, and may be another operation on the touch panel 221 or may be a selection operation using the hard key 222.

In the first to third embodiments, the description has been given on the assumption that the system includes the server device 100. However, the information of FIGS. 5A to 5E (as for the user information, the user information of the user of the terminal device 200 only) may be stored in the terminal device 200, and the system may be performed only with the terminal device 200.

The system can be configured by appropriate combination or replacement of the elements described in the embodiments.

The processing and the procedures described in the present specification can be realized not only by the means explicitly described in the embodiments but also by software, hardware, or a combination of the software and the hardware. To be specific, the processing and the procedures described in the present specification are realized by implementing a logic corresponding to the processing to a medium such as an integrated circuit, a volatile memory, a non-volatile memory, a magnetic disk, or an optical storage and the like. Further, the processing and the procedures described in the present specification are realized by implementing the processing and the procedures as computer program, and causing various computers including the terminal device and the server device to execute the computer program.

Even if the processing and the procedures in the present specification being executed by a single device, software, component, or module has been described, such processing or procedures can be executed by a plurality of devices, a plurality of pieces of software, a plurality of components, and/or a plurality of modules. Further, even if the various types of information in the present specification being stored to a single memory or storage unit has been described, such information can be distributed and stored in a plurality of memories included in a single device or a plurality of memories distributed and arranged in a plurality of devices. Further, the elements of the software and hardware described in the present specification can be realized by integrating into a smaller number of components or divided into a larger number of components.

What is claimed is:

1. A terminal device comprising:
   a sensor configured to detect a current position of the terminal device in a real world;
   a memory configured to store computer-readable instructions and item information relating to a plurality of first items, the plurality of first items being virtually arranged in association with a plurality of first predetermined positions in the real world, respectively, the plurality of first items corresponding to some of a plurality of items, the plurality of items being usable in a game application;
   a processor configured to execute the computer-readable instructions so as to:
      extract a providable first item among the plurality of first items in response to the current position, the providable first item being virtually arranged within a predetermined range from the current position in the real world;
      provide the providable first item to a user, the user executing the game application;
      create a second item based on the providable first item, the second item being usable in the game application; and
      associate the created second item with a second predetermined position in the real world; and
   a communication circuit configured to:
      receive the item information relating to the plurality of first items virtually arranged in association with the plurality of first predetermined positions in the real world from a server device; and
      transmit the item information relating to the created second item associated with the second predetermined position in the real world to the server device,
   wherein the created second item is a game element being usable in the game application, and
   the game element including one of:
      a unit game including a quest, a scenario, a chapter, a dungeon, a mission, or an event being usable in the game application;
      a character being usable in the game application; and
      a plurality of parts including a structural item or a part of the character being usable in the game application.

2. The terminal device according to claim 1,
   wherein the providable first item is configured with the plurality of parts, and the processor provides the plurality of parts to the user, and
   the processor is configured to:
      determine at least one part of the plurality of parts based on selection of the user so as to create the second item.

3. The terminal device according to claim 1,
   wherein the providable first item is configured with a plurality of enemy characters, and the processor provides the plurality of enemy characters to the user, and
   the processor is configured to:

determine at least one enemy character of the plurality of enemy characters based on selection of the user so as to create the second item.

4. The terminal device according to claim 1, wherein the game application includes one of a battle-type game application, a breakout game application, a puzzle game application, a roll-playing game application, or a sport game application.

5. The terminal device according to claim 1, further comprising:
a display configured to display the plurality of first item including the providable first item and the created second item,
wherein the processor is configured to display the current position and the predetermined range in the display.

6. A server device comprising:
a memory configured to store computer-readable instructions and item information relating to a plurality of first items, the plurality of first items being virtually arranged in association with a plurality of first predetermined positions in a real world, respectively, the plurality of first items corresponding to some of a plurality of items, the plurality of items being usable in a game application executed in a plurality of terminal devices;
a processor configured to execute the computer-readable instructions so as to:
receive a current position of a first terminal device of the plurality of terminal devices in the real world, the current position being detected by a sensor disposed in the first terminal device;
transmit the item information from the server device to the first terminal device via the communication circuit;
detect a providable first item among the plurality of first items, the providable first item being virtually arranged within a predetermined range from the current position of the first terminal device in the real world, the providable first item being providable to a user, the user executing the game application in the first terminal device;
create a second item based on the providable first item, the created second item being associated with a second predetermined position in the real world
receive the item information related to the created second item from the first terminal device via the communication circuit; and
store the received item information relating to the created second item in the memory; and
a communication circuit configured to:
perform communication with the plurality of terminal devices;
transmit the item information relating to the plurality of first items virtually arranged in association with the plurality of first predetermined positions in the real world to the first terminal device; and
receive the item information relating to the created second item associated with the second predetermined position in the real world from the first terminal device,
wherein the created second item is a game element being usable in the game application, and
the game element including one of:
a unit game including a quest, a scenario, a chapter, a dungeon, a mission, or an event being usable in the game application;
a character being usable in the game application; and
a plurality of parts including a structural item or a part of the character being usable in the game application.

7. The server device according to claim 6, wherein the communication circuit performs communication with the plurality of terminal devices capable of executing the game application, including the first terminal device, and
wherein when the processor receives the item information relating to the created second item created by the first terminal device, the processor is configured to transmit the item information relating to the created second item to a different terminal device other than the first terminal device among the plurality of terminal devices.

8. The server device according to claim 6, wherein the providable first item is configured with the plurality of parts, and the processor provides the plurality of parts to the user, and
at least one part of the plurality of parts is determined based on selection of the user so as to create the second item.

9. The server device according to claim 6, wherein the providable first item is configured with a plurality of enemy characters, and the processor provides the plurality of enemy characters to the user, and
at least one enemy character of the plurality of enemy characters is determined based on selection of the user so as to create the second item.

10. The server device according to claim 6, wherein the game application includes one of a battle-type game application, a breakout game application, a puzzle game application, a roll-playing game application, or a sport game application.

11. The server device according to claim 6, wherein the first terminal device has a display configured to display the plurality of first item including the providable first item and the created second item,
the processor is configured to display the current position and the predetermined range in the display of the first terminal device, and
wherein the display is provided in each of the plurality of terminal devices.

12. A computer program product embodying computer-readable instructions stored on a non-transitory computer-readable medium, the non-transitory computer-readable medium including:
item information relating to a plurality of first items, the plurality of first items being virtually arranged in association with a plurality of first predetermined positions in a real world, respectively, the plurality of first items corresponding to some of a plurality of items, the plurality of items being usable in a game application,
the non-transitory computer-readable medium causing a computer to execute a process by a processor so as to perform the steps of:
receiving a current position of a terminal device in the real world, the current position being detected by a sensor disposed in the terminal device;
detecting a providable first item among the plurality of first items, the providable first item being virtually arranged within a predetermined range from the current position of the terminal device in the real world;
providing the providable first item to a user of the terminal device, the user executing the game application in the terminal device;

creating a second item based on the providable first item, the second item being usable in the game application;

associating the created second item with a second predetermined position in the real world;

receiving the item information relating to the plurality of first items virtually arranged in association with the plurality of first predetermined positions in the real world from a server device via a communication circuit in the terminal device; and transmitting the item information relating to the created second item associated with the second predetermined position in the real world to the server device via the communication circuit, wherein the created second item is a game element being usable in the game application, and the game element including one of:

a unit game including a quest, a scenario, a chapter, a dungeon, a mission, or an event being usable in the game application;

a character being usable in the game application; and a plurality of parts including a structural item or a part of the character being usable in the game application.

13. The computer program product according to claim 12, wherein the communication circuit performs communication with the plurality of terminal devices capable of executing the game application, including the first terminal device, and wherein when the processor receives the item information relating to the created second item created by the first terminal device, the processor is configured to transmit the item information relating to the created second item to a different terminal device other than the first terminal device among the plurality of terminal devices.

14. The computer program product according to claim 12, wherein the providable first item is configured with the plurality of parts, and the processor provides the plurality of parts to the user, and at least one part of the plurality of parts is determined based on selection of the user so as to create the second item.

15. The computer program product according to claim 12, wherein the providable first item is configured with a plurality of enemy characters, and the processor provides the plurality of enemy characters to the user, and at least one enemy character of the plurality of enemy characters is determined based on selection of the user so as to create the second item.

16. The computer program product according to claim 12, wherein the game application includes one of a battle-type game application, a breakout game application, a puzzle game application, a roll-playing game application, or a sport game application.

17. A method for causing a processor in a terminal device to execute computer-readable instructions stored in a memory, the memory configured to store item information relating to a plurality of first items, the plurality of first items being virtually arranged in association with a plurality of first predetermined positions in a real world, respectively, the plurality of first items corresponding to some of a plurality of items, the plurality of items being usable in a game application, the method comprising executing on the processor the steps of:

receiving a current position of the terminal device in the real world, the current position being detected by a sensor disposed in the terminal device;

detecting a providable first item among the plurality of first items, the providable first item being virtually arranged within a predetermined range from the current position of the terminal device in the real world;

providing the providable first item to a user of the terminal device, the user executing the game application in the terminal device;

creating a second item based on the providable first item, the second item being usable in the game application;

associating the created second item with a second predetermined position in the real world;

receiving the item information relating to the plurality of first items virtually arranged in association with the plurality of first predetermined positions in the real world from a server device via a communication circuit in the terminal device; and transmitting the item information relating to the created second item associated with the second predetermined position in the real world to the server device via the communication circuit, wherein the created second item is a game element being usable in the game application, and the game element including one of:

a unit game including a quest, a scenario, a chapter, a dungeon, a mission, or an event being usable in the game application;

a character being usable in the game application; and a plurality of parts including a structural item or a part of the character being usable in the game application.

18. The method according to claim 17, wherein the providable first item is configured with the plurality of parts, and the processor provides the plurality of parts to the user, and the processor is configured to:

determine at least one part of the plurality of parts based on selection of the user so as to create the second item.

19. The method according to claim 17, wherein the providable first item is configured with a plurality of enemy characters, and the processor provides the plurality of enemy characters to the user, and the processor is configured to:

determine at least one enemy character of the plurality of enemy characters based on selection of the user so as to create the second item.

20. The method according to claim 17, wherein the game application includes one of a battle-type game application, a breakout game application, a puzzle game application, a roll-playing game application, or a sport game application.

* * * * *